(12) United States Patent
Oogose et al.

(10) Patent No.: US 12,426,584 B2
(45) Date of Patent: Sep. 30, 2025

(54) DUAL-BEARING REEL FOR FISHING

(71) Applicant: Shimano Inc., Sakai (JP)

(72) Inventors: Hiroki Oogose, Sakai (JP); Takeshi Ikuta, Sakai (JP); Kunio Takechi, Sakai (JP)

(73) Assignee: SHIMANO INC., Osaka (JP)

( * ) Notice: Subject to any disclaimer, the term of this patent is extended or adjusted under 35 U.S.C. 154(b) by 171 days.

(21) Appl. No.: 18/478,566

(22) Filed: Sep. 29, 2023

(65) Prior Publication Data
US 2024/0138388 A1 May 2, 2024

(30) Foreign Application Priority Data
Oct. 31, 2022 (JP) ................. 2022-174775

(51) Int. Cl.
A01K 89/01 (2006.01)
A01K 89/015 (2006.01)
A01K 89/033 (2006.01)

(52) U.S. Cl.
CPC ...... A01K 89/045 (2015.05); A01K 89/01931 (2015.05)

(58) Field of Classification Search
CPC .......... A01K 89/0189; A01K 89/01903; A01K 89/01909; A01K 89/05; A01K 89/058; A01K 89/059
See application file for complete search history.

(56) References Cited

U.S. PATENT DOCUMENTS

2016/0278355 A1* 9/2016 Ikuta ................. A01K 89/046
2020/0296947 A1* 9/2020 Chew ............... A01K 89/01928

FOREIGN PATENT DOCUMENTS

| JP | H119160 A | * | 1/1999 | .......... A01K 89/033 |
| JP | 2004135683 A | * | 5/2004 | |
| JP | 2006180777 A | * | 7/2006 | .......... A01K 89/033 |
| JP | 4324268 B2 | | 9/2009 | |
| JP | 2014176359 A5 | * | 4/2016 | ............. A01K 89/01 |

* cited by examiner

Primary Examiner — Emmanuel M Marcelo
(74) Attorney, Agent, or Firm — United IP Counselors, LLC

(57) ABSTRACT

A dual-bearing reel for fishing includes a drag disc non-rotatably mounted on a spool; a pinion gear collar disposed on the handle side of the drag disc and immovable in a spool shaft direction; a drag receiver disposed on the side opposite the handle and movable in the spool shaft direction in conjunction with a spool shaft; a biasing member configured to bias the drag disc and the drag receiver in a direction that separates them; a drag lever movable between a clamping position and a separation position; and a movement mechanism configured to move the spool shaft to the side opposite the handle such that the drag disc, the pinion gear collar, and the drag receiver are separated from each other, and configured to move the spool shaft to the handle side such that the pinion gear collar and the drag receiver clamp the drag disc.

15 Claims, 8 Drawing Sheets

DUAL-BEARING REEL FOR FISHING

CROSS-REFERENCE TO RELATED APPLICATIONS

This application claims priority to Japanese Patent Application No. 2022-174775, filed Oct. 31, 2022. The contents of that application are incorporated by reference herein in their entirety.

TECHNICAL FIELD

The present invention relates to a dual-bearing reel for fishing.

BACKGROUND ART

There is known a dual-bearing reel for fishing configured to include a drag mechanism in which a pair of drag discs clamp a brake disc that rotates together with a spool so as to apply a braking force (see, for example, JP 4324268 B).

BRIEF SUMMARY

With the known dual-bearing reel, the spool and the drag discs are configured to be pushed from the handle side to the side opposite the handle by rotating a drag lever (operation member). Due to this, since the drag mechanism is provided on a reel body portion on the side opposite the handle, and consequently the size of the reel body on the side opposite the handle is increased, there is a problem that the reel is harder to hold, and thus improvement is needed.

The present invention has been conceived in view of such circumstances, and an object of the present invention is to provide a dual-bearing reel for fishing that is easier to hold by reducing the size of the reel body so as to be small.

(1) A first aspect of a dual-bearing reel for fishing according to the present invention is a dual-bearing reel for fishing including a handle provided on a reel body, a spool shaft supported in the reel body, and a spool rotatable relative to the spool shaft by operation of the handle, the dual-bearing reel for fishing including: a first transmission portion non-rotatably mounted on the spool; a second transmission portion to which rotation from the handle is transmitted, disposed facing a first surface on the handle side of the first transmission portion, and immovable in a spool shaft direction of the spool shaft; a third transmission portion to which the rotation from the handle is transmitted, disposed facing a second surface on a side opposite the handle of the first transmission portion, and movable in the spool shaft direction in conjunction with the spool shaft; a biasing member configured to bias the first transmission portion and the third transmission portion in a direction in which the first transmission portion and the third transmission portion are separated from each other; an operation member provided so as to be movable between a clamping position in which the second transmission portion and the third transmission portion clamp the first transmission portion in the spool shaft direction and a separation position in which the first transmission portion, the second transmission portion, and the third transmission portion are separated from each other in the spool shaft direction; and a movement portion configured to move the spool shaft to the side opposite the handle in such a manner that the first transmission portion, the second transmission portion, and the third transmission portion are separated from each other in the spool shaft direction in response to movement of the operation member from the clamping position side to the separation position side, and configured to move the spool shaft to the handle side in such a manner that the second transmission portion and the third transmission portion clamp the first transmission portion in response to the movement of the operation member from the separation position side to the clamping position side.

According to the first aspect of the dual-bearing reel for fishing according to the present invention, when a drag force is to be adjusted to be strong or weak, the operation member is operated to move from the clamping position side to the separation position side, and the spool shaft is moved by the movement portion to the side opposite the handle by biasing with the biasing member, whereby the second transmission portion and the third transmission portion are separated from the first transmission portion to establish a drag release state, so that the spool becomes freely rotatable. Consequently, a fishing line can be reeled out (casting). On the other hand, when the operation member is operated to move from the separation position side to the clamping position side and the spool shaft is gradually moved toward the handle side by the movement portion, the first transmission portion is clamped by the second transmission portion and the third transmission portion to establish a clamping state. As a result, a pressure-contact force of the second transmission portion and the third transmission portion against the first transmission portion increases, and the drag force increases.

As described above, according to the present invention, when the operation member is moved to the clamping position to brake the rotation of the spool in a reel-out direction, the spool shaft is pulled toward the handle side by the movement portion, and at least the first, second, and third transmission portions are moved closer to the handle side than to the spool. Consequently, the length (height) can be reduced so as to be small in the axial direction of the reel body on the side opposite the handle, and the reel can thus be made easier to hold.

(2) In the dual-bearing reel for fishing of a second aspect of the present invention according to the first aspect, the first transmission portion preferably includes a first disc portion extending from an outer peripheral portion of a flange on the handle side of the spool toward an inner side in a radial direction of the spool shaft.

In this case, since the first disc portion of the first transmission portion is disposed at the inner side in the radial direction of the outer peripheral portion of the handle-side flange, the second transmission portion and the third transmission portion that clamp the first disc portion therebetween may also be disposed at positions closer to the handle side than to the spool. Consequently, the length (height) can be reduced so as to be small in the axial direction of the reel body on the side opposite the handle, and the reel can thus be made easier to hold.

(3) In the dual-bearing reel for fishing of a third aspect of the present invention according to the first aspect, the second transmission portion preferably includes a second disc portion extending from a gear portion that rotates with the rotation of the handle toward an outer side in a radial direction of the spool shaft.

In this case, since the second disc portion of the second transmission portion is disposed extending at the outer side in the radial direction of the gear portion provided closer to the handle side than to the spool, the first transmission portion and the third transmission portion that transmit a braking force via the second disc portion may also be disposed aggregated at positions closer to the handle side than to the spool. Consequently, the length (height) can be reduced so as to be small in the axial direction of the reel body on the side opposite the handle, and the reel can thus be made easier to hold.

(4) In the dual-bearing reel for fishing of a fourth aspect of the present invention according to any one of the first to third aspects, the third transmission portion may include a third disc portion extending from a sleeve portion that rotates together with the spool shaft toward an outer side in the radial direction of the spool shaft.

In this case, since the third disc portion of the third transmission portion is disposed extending at the outer side in the radial direction at a portion on the handle side of the sleeve portion, the first transmission portion and the third transmission portion that transmit a braking force via the third disc portion may also be disposed aggregated at positions closer to the handle side than to the spool. Consequently, the length (height) can be reduced so as to be small in the axial direction of the reel body on the side opposite the handle, and the reel can thus be made easier to hold.

(5) In the dual-bearing reel for fishing of a fifth aspect of the present invention according to any one of the first to fourth aspects, one of the second transmission portion and the third transmission portion may include a protrusion extending toward the other one of the second transmission portion and the third transmission portion, and the other one may include a hole to be engaged movably along the protrusion and may rotate together with the one of the second transmission portion and the third transmission portion.

In this case, swinging of the third transmission portion, along the protrusion, relative to the second transmission portion that is immovable in the spool shaft direction can be suppressed, so that movement may be made in a stable posture. As a result, the accuracy of braking may be enhanced. Further, in this case, since the protrusion is engaged with the hole, relative rotation of the second transmission portion and the third transmission portion in the circumferential direction is restricted. Thus, the second transmission portion and the third transmission portion can be rotated together by the above-discussed simple structure.

(6) In the dual-bearing reel for fishing of a sixth aspect of the present invention according to any one of the first to fifth aspects, the biasing member may be a corrugated annular coil spring.

In this case, a characteristic of obtaining a more stable drag curve as compared with a disc spring can be provided, and braking with high accuracy can be performed.

(7) In the dual-bearing reel for fishing of a seventh aspect of the present invention according to the sixth aspect, the biasing member may be a multilayer-winding-type corrugated annular coil spring.

In this case, a characteristic of exhibiting linearity under a high load condition and obtaining a stable drag curve as compared with a disc spring can be provided, and braking with higher accuracy can be performed.

(8) In the dual-bearing reel for fishing of an eighth aspect of the present invention according to any one of the first to seventh aspects, the first transmission portion may include a drag plate that rotates together with the spool, the second transmission portion may include a pinion gear collar that rotates together with the handle, and the third transmission portion may include a drag receiver that is movable together with the spool shaft in the spool shaft direction; and the dual-bearing reel for fishing may further include a braking portion configured to brake rotation in a reel-out direction of the spool by moving the spool shaft toward the handle side in such a manner that the drag plate is clamped by the pinion gear collar and the drag receiver in response to the movement of the operation member from the separation position side to the clamping position side.

In this case, the spool shaft is configured to be pulled toward the handle side by the movement portion in when the rotation in the reel-out direction of the spool is braked by moving the operation member to the clamping position, and at least the drag plate, the pinion gear collar, and the drag receiver are provided closer to the handle side than to the spool. Accordingly, the length (height) can be reduced so as to be small in the axial direction of the reel body on the side opposite the handle, whereby the reel may be easier to hold.

With the dual-bearing reel for fishing according to the present invention, since the size of the reel body is reduced so as to be small, the reel may be easier to hold.

DETAILED DESCRIPTION

Figure 1:
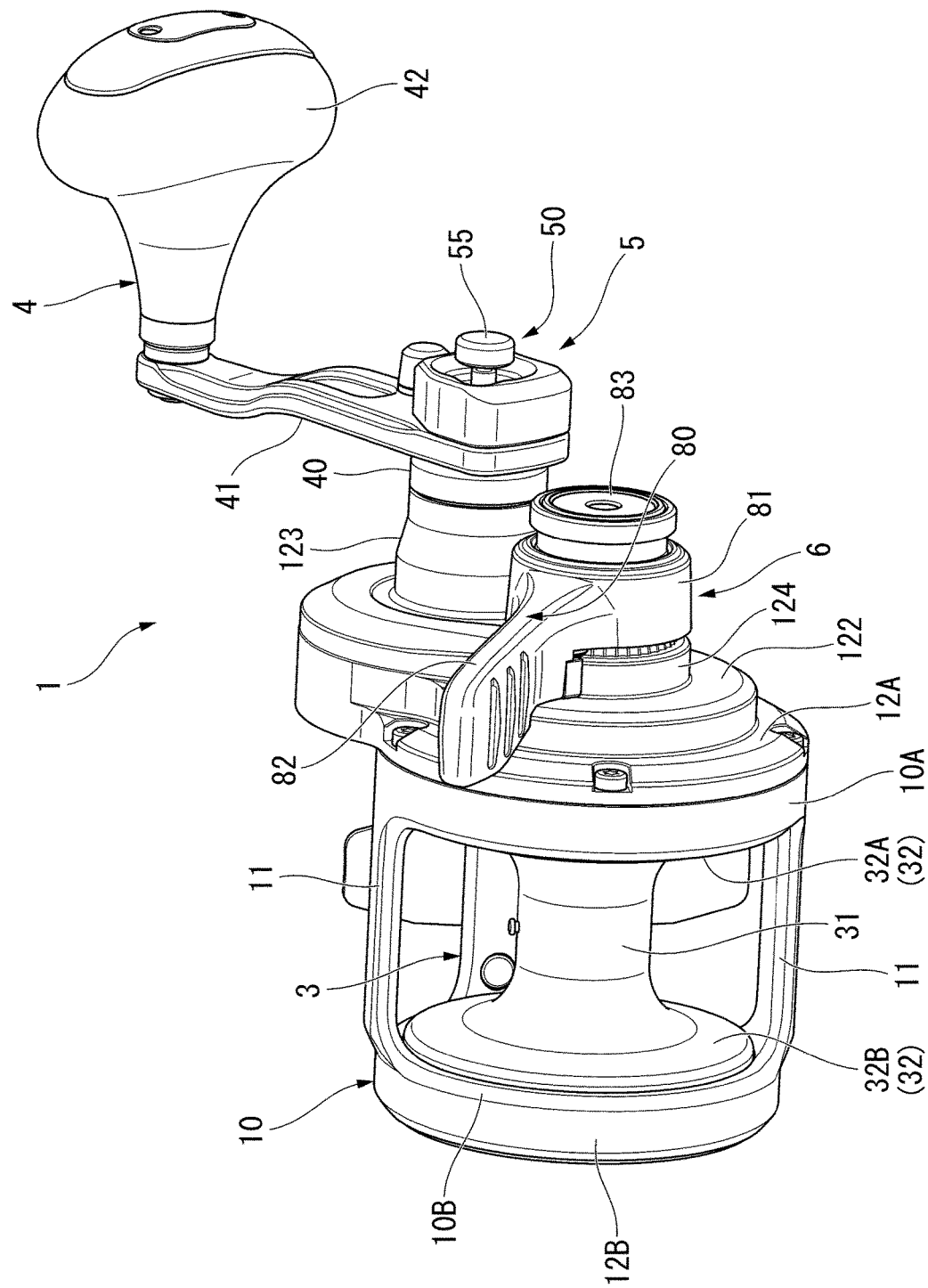
FIG. 1 is a diagram illustrating an embodiment of the present invention and is a perspective view of a baitcasting reel.

Hereinafter, an embodiment of a dual-bearing reel for fishing according to the present invention will be described with reference to the drawings. Note that, in the drawings, the scale of each constituent member may be appropriately changed as necessary so that each constituent member has a visible size. In the present embodiment, as a dual-bearing reel for fishing, a baitcasting reel will be cited as an example and described.

Overall Configuration

As illustrated in FIG. 1, a dual-bearing reel for fishing (hereinafter referred to as a baitcasting reel 1) of the present embodiment is a medium-sized lever drag reel that can wind a fishing line. The baitcasting reel 1 includes a drag lever 80 for adjusting a braking force of a drag mechanism 6 configured to brake the rotation of a spool 3.

The baitcasting reel 1 includes a reel body 10 formed in a tubular shape, a spool shaft 2 attached to a central portion of the reel body 10 to be non-rotatable and to be movable in an axial direction, the spool 3 supported by the spool shaft 2 to be rotatable and to be immovable in the axial direction, and a handle 4 disposed lateral to the reel body 10.

Note that, in an example illustrated in FIG. 1, the handle 4 is disposed at the right side of the reel body 10; in the following examples, the handle 4 side is referred to as "right side" or "right direction", and the side on which the handle 4 is not disposed is referred to as "left side" or "left direction".

Figure 2:
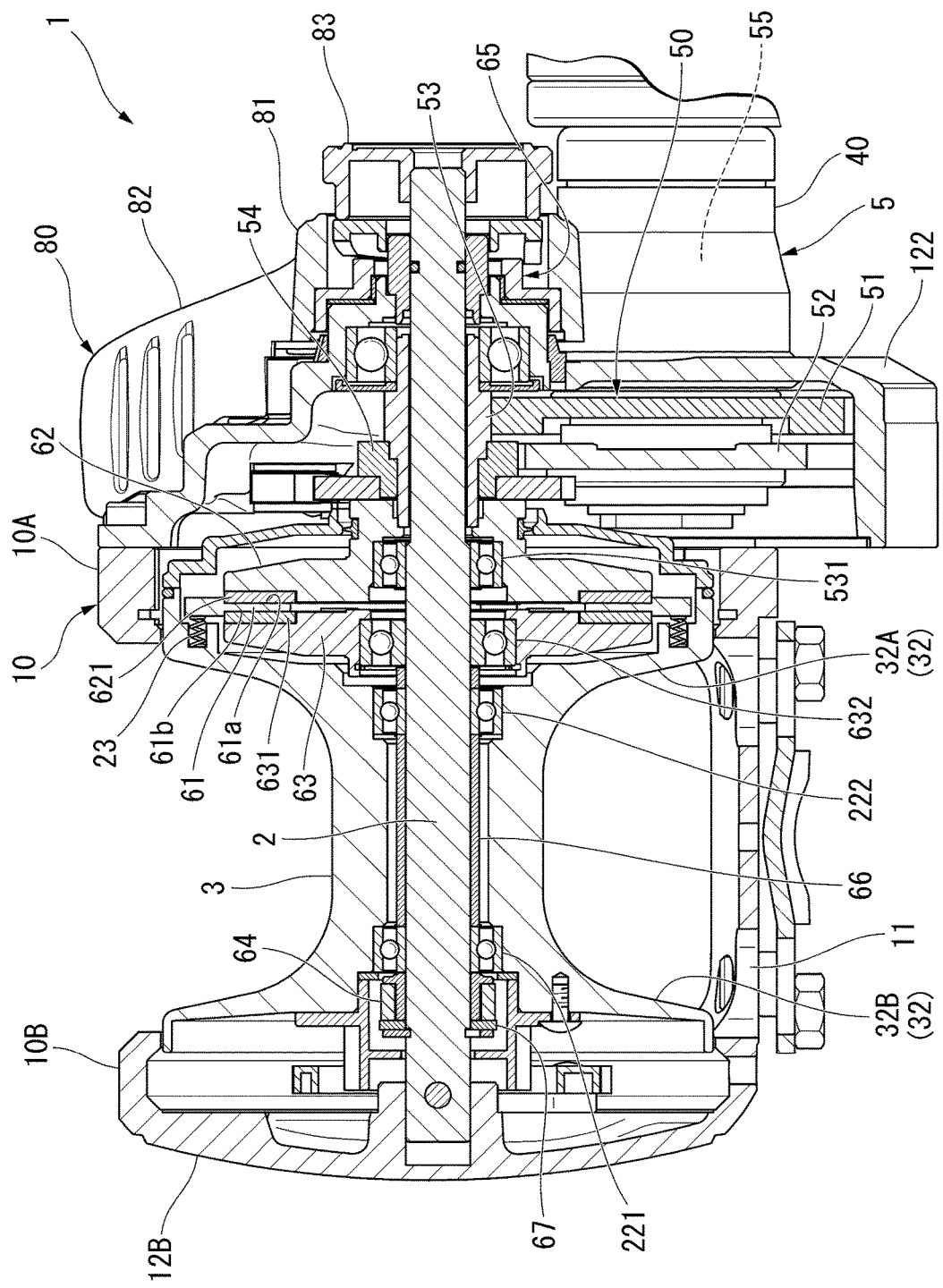
FIG. 2 is a cross-sectional view of the baitcasting reel illustrated in FIG. 1.

As illustrated in FIG. 2, the baitcasting reel 1 includes, inside the reel body 10, a rotation transmission mechanism 5 configured to transmit the rotation of the handle 4 to the spool 3, and the drag mechanism 6 configured to brake the rotation in a reel-out direction of the spool 3.

Reel Body

The reel body 10 includes a right side plate 10A and a left side plate 10B, which are formed in a disc-like shape, made of metal, and paired with each other; a plurality of coupling portions 11 coupling the right side plate 10A and the left side plate 10B at the front and rear, and at a lower portion; a right cover member 12A covering the outer side of the right side plate 10A; and a left cover member 12B formed integrally with the left side plate 10B to cover the outer side of the left side plate 10B.

The coupling portion 11 is integrally formed with a rod mounting portion 13 for mounting the baitcasting reel 1 on a fishing rod. The right side plate 10A, the left side plate 10B, the coupling portion 11, and the left cover member 12B are integrally formed by metal-cutting.

As illustrated in FIG. 1, the right cover member 12A is made of metal and covers the outer side of the right side plate 10A. The right side plate 10A and the left side plate 10B have openings through which the spool 3 can pass. Inside the left cover member 12B, there is formed a boss portion (not illustrated) configured to support the left end of the spool shaft 2 in such a manner that the spool shaft 2 is movable in the axial direction and non-rotatable. Inside the left cover member 12B, there is provided a spool sound generation mechanism (not illustrated) configured to generate sound in response to the rotation of the spool 3.

As illustrated in FIGS. 1 and 2, a bulge portion 122 projecting in a radial direction and also projecting outward in the axial direction is formed on the right cover member 12A on the handle 4 side. The rotation transmission mechanism 5 is provided to the bulge portion 122. A first support tubular portion 123 for supporting a handle shaft 40 of the handle 4 and a second support tubular portion 124 for supporting a drag lever 80 are formed on the bulge portion 122. Each of the first support tubular portion 123 and the second support tubular portion 124 is formed to protrude outward in the axial direction.

Spool Shaft

As illustrated in FIG. 2, the spool shaft 2 is supported by the boss portion (not illustrated) of the left cover member 12B and the right cover member 12A to be movable in the axial direction and to be non-rotatable. The spool shaft 2 rotatably supports the spool 3 by two bearings, i.e., a first bearing 221 and a second bearing 222, disposed on an outer peripheral surface of the spool shaft 2. Inward movement of the inner side surfaces in the axial direction of the first bearing 221 and the second bearing 222 is restricted by the spool 3 and the spool shaft 2. The spool shaft 2 and the spool 3 can move integrally in the axial direction. The spool shaft 2 moves together with the spool 3 in the axial direction by the drag mechanism 6.

Spool

As illustrated in FIG. 2, the spool 3 includes a bobbin trunk portion 31 and flange portions 32 integrally formed at both ends of the bobbin trunk portion 31. A drag disc 61 constituting the drag mechanism 6 is fixed to an end surface of the flange portion 32A on the right side by a screw.

Handle

As illustrated in FIGS. 1 and 2, the handle 4 is fixed to a protruding end of the tubular handle shaft 40 disposed below the spool shaft 2 and parallel to the spool shaft 2. The handle shaft 40 is rotatably supported by the reel body 10. The handle 4 includes a handle arm 41 with a through hole formed therein (not illustrated) in a direction intersecting a longitudinal direction, and a handle grip 42 rotatably mounted on an end portion of the handle arm 41. The handle arm 41 is a plate-like member made of a metal, and the handle shaft 40 is attached in the above-mentioned through hole having a non-circular shape formed in a base end portion of the handle arm 41 in an integrally rotatable manner with the handle arm 41.

Rotation Transmission Mechanism

As illustrated in FIG. 2, the rotation transmission mechanism 5 includes a gear shifting operation mechanism 50 that can switch between two speeds, i.e., high and low speeds. The gear shifting operation mechanism 50 includes a first main gear 51 for high-speed winding and a second main gear 52 for low-speed winding rotatably supported on the handle shaft 40 of the handle 4, a first pinion gear 53 and a second pinion gear 54 rotatably mounted on the spool shaft 2 in a state of engaging with the first main gear 51 and the second main gear 52 respectively, an engagement piece (not illustrated) for coupling one of the first main gear 51 and the second main gear 52 to the handle shaft 40 so as to transmit rotation, and an operation shaft 55 for setting the position of the engagement piece to one of a high-speed position to engage with the first main gear 51 and a low-speed position to engage with the second main gear 52. The operation shaft 55 is biased outward in the axial direction and toward the second main gear 52 via the engagement piece by a spring member (not illustrated).

The first pinion gear 53 is a tubular member made of a corrosion-resistant metal such as a non-magnetic stainless alloy. The right end of the first pinion gear 53 is rotatably supported by a fourth bearing 531 mounted on the bulge portion 122 at the outer side of the spool shaft 2. The left end of the first pinion gear 53 is engaged with a pinion gear collar 62 (second transmission portion) of the drag mechanism 6 in an integrally rotatable manner. The second pinion gear 54 is a tubular member made of the same material as that of the first pinion gear 53, and the left end thereof is engaged with the drag disc 61 (drag plate, first transmission portion) in an integrally rotatable manner.

As illustrated in FIG. 1, the operation shaft 55 is inserted through a through hole of the handle shaft 40. An end portion of the operation shaft 55 on the right side in FIG. 1 protrudes outward in the axial direction of the handle arm 41 (rightward in FIG. 1), and the operation shaft 55 can be pushed leftward in FIG. 1. The operation shaft 55 is freely supported in the axial direction by a nut member (not illustrated) for fixing the handle 4, which is screwed into the protruding end of the handle shaft 40, to the handle shaft 40.

Drag Mechanism

Figure 3:
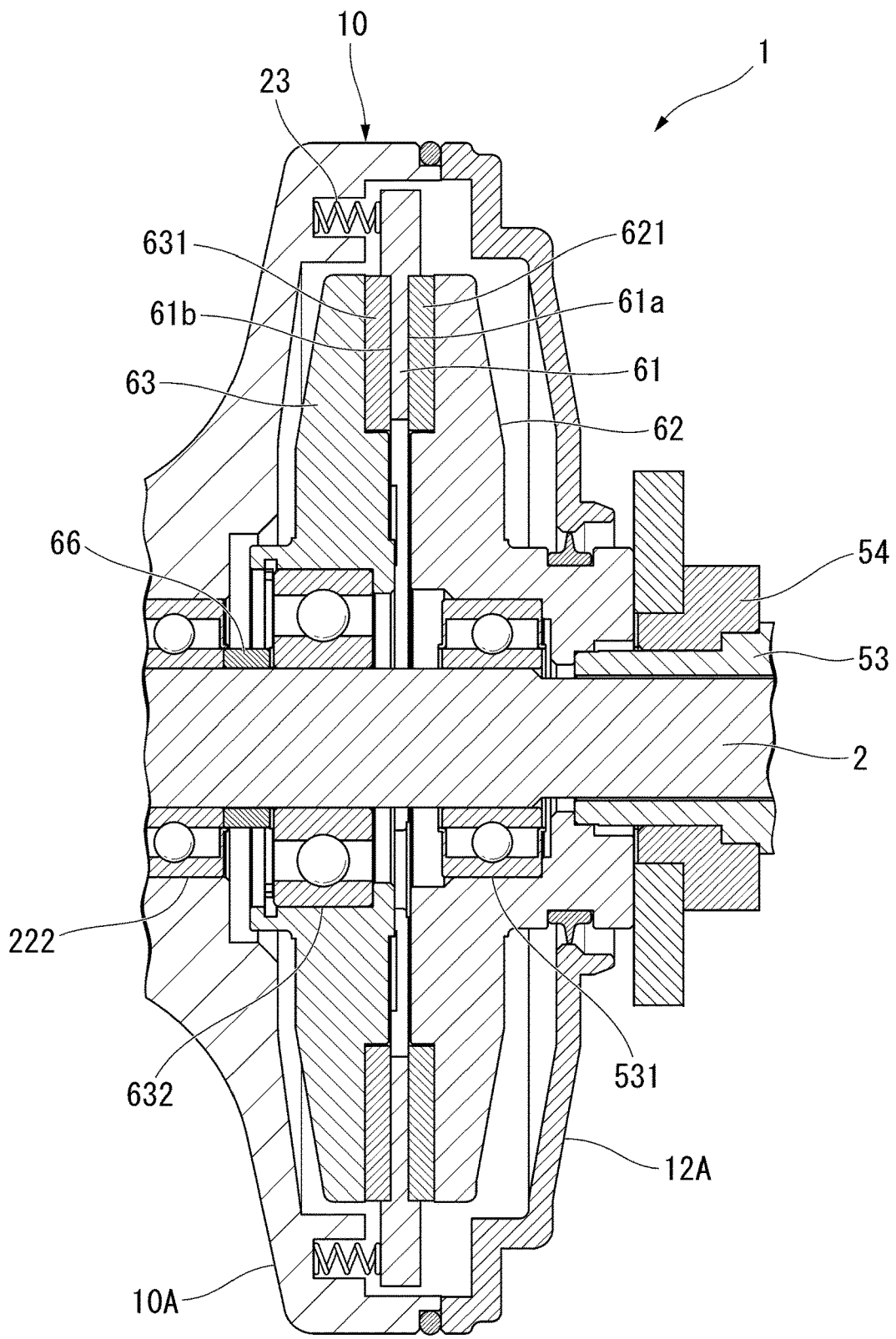
FIG. 3 is an enlarged view of a main part of a drag mechanism illustrated in FIG. 2.
Figure 4:
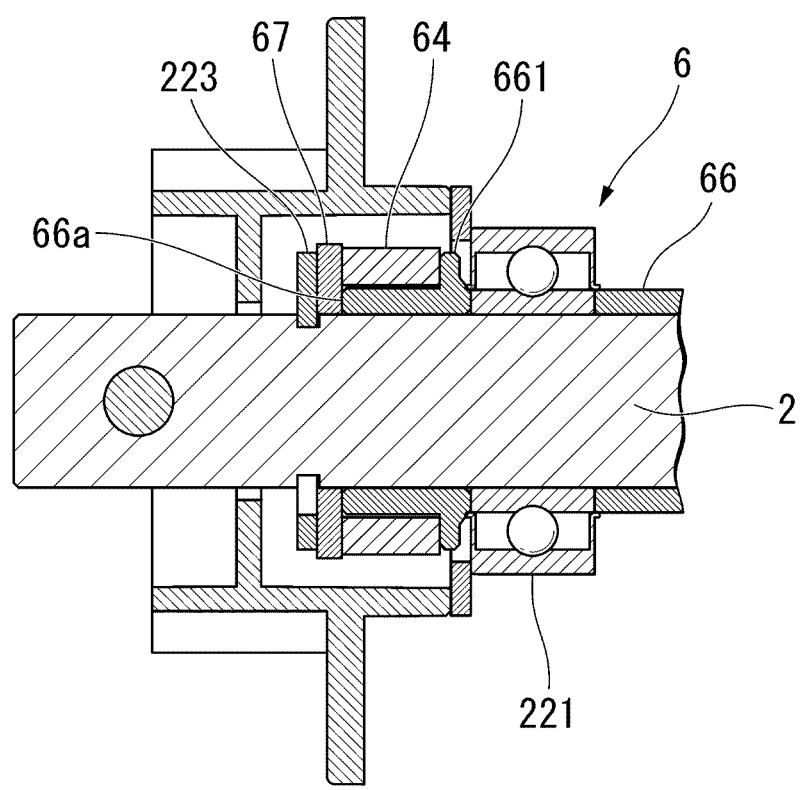
FIG. 4 is a cross-sectional view illustrating a configuration of a biasing member on the left side of a spool shaft illustrated in FIG. 2.

As illustrated in FIGS. 3 and 4, the drag mechanism 6 (braking portion) includes: the drag disc 61 (drag plate, first transmission portion) non-rotatably mounted on the spool 3; the pinion gear collar 62 (second transmission portion) to which the rotation from the handle 4 is transmitted, disposed facing a first surface 61a on the handle side of the drag disc 61, and immovable in the spool shaft direction; a drag receiver 63 (third transmission portion) to which the rotation from the handle 4 is transmitted, disposed facing a second surface 61b on the opposite side of the drag disc 61, and movable in the spool shaft direction in conjunction with the spool shaft 2; a biasing member 64 configured to bias the drag disc 61 and the drag receiver 63 in a direction in which the drag disc 61 and the drag receiver 63 are separated from each other; a movement mechanism 65 (movement portion) for reciprocating the spool shaft 2 in the axial direction; and the drag lever 80 (operation member) for operating the movement mechanism 65.

The drag lever 80, details of which will be described later, is movable (swingable) between a clamping position P1, where the pinion gear collar 62 and the drag receiver 63 clamp the drag disc 61 in the spool shaft direction, and a separation position P2, where the drag disc 61, the pinion gear collar 62, and the drag receiver 63 are separated from each other in the spool shaft direction.

The drag disc 61 is a disc-shaped brake disc (first disc portion) made of stainless steel and rotates together with the spool 3. The drag disc 61 extends toward the inner side in the radial direction of the spool shaft 2 from the outer peripheral portion of the flange portion 32A on the handle side (right side) of the spool 3. A coil spring 23 is interposed between the flange portion 32A on the right side of the spool 3 and the drag disc 61 to separate the drag disc 61 from the right-side flange portion 32A. The coil spring 23 biases the drag disc 61 to the right side along with the rightward movement of the spool 3 until the drag lever 80 reaches an intermediate position between the separation position P2 and the clamping position P1. At this time, the drag disc 61 is brought into contact with a first friction plate 621 (described below) of the pinion gear collar 62 to generate a frictional force, thereby generating a drag force.

The pinion gear collar 62 forms a disc-shaped disc portion (second disc portion) extending from a gear portion (first pinion gear 53) that rotates together with the rotation of the handle 4 toward the outer side in the radial direction of the spool shaft 2. The pinion gear collar 62 includes the first friction plate 621 facing the first surface 61a of the drag disc 61. The pinion gear collar 62 includes a protrusion (not illustrated) extending toward the drag receiver 63 in the spool shaft direction.

The drag receiver 63 is movable in the spool shaft direction together with the spool shaft 2 and forms a disc-shaped disc portion (third disc portion) extending from a sleeve portion 66 toward the outer side in the radial direction of the spool shaft 2. The drag receiver 63 is rotatable relative to the spool shaft 2 via a third bearing 632. The drag receiver 63 includes a second friction plate 631 facing the second surface 61b of the drag disc 61. The drag receiver 63 includes a hole (not illustrated) for movable engagement along the protrusion of the pinion gear collar 62, and rotates together with the pinion gear collar 62.

The first friction plate 621 of the pinion gear collar 62 and the second friction plate 631 of the drag receiver 63 are washer-shaped disc members made of a wear-resistant material such as carbon graphite or fiber-reinforced resin, for example, and are fixed to the outer side surfaces by a plurality of mounting bolts disposed at intervals in the circumferential direction.

As illustrated in FIG. 4, a first flange portion 661 protruding toward the outer side in the radial direction is provided to a left end portion of the sleeve portion 66. The first flange portion 661 is located on the right side relative to a left end surface 66a of the sleeve portion 66. To a left end portion of the spool shaft 2, there is provided a second flange portion 223 protruding toward the outer side in the radial direction from a position separated leftward from the first flange portion 661 of the sleeve portion 66.

The biasing member 64 is disposed between the first flange portion 661 and the second flange portion 223. Further, a spacer 67 is provided between the second flange portion 223 and the biasing member 64. The spacer 67 has a ring shape and is fitted on the outer side of the spool shaft 2. In a case where the spool shaft 2 moves rightward, the spacer 67 is pushed by the second flange portion 223 to move rightward against the biasing force of the biasing member 64, and is stopped at a position where the spacer 67 is in contact with the left end surface 66a of the sleeve portion 66. That is, in the present embodiment, this stop position refers to the above-described clamping position P1 of the drag lever 80 (the position at which the drag disc 61 is clamped in the spool shaft direction by the pinion gear collar 62 and the drag receiver 63). Note that, depending on the setting or adjustment, the clamping position P1 of the drag lever 80 may be shifted forward or backward.

Figure 5:
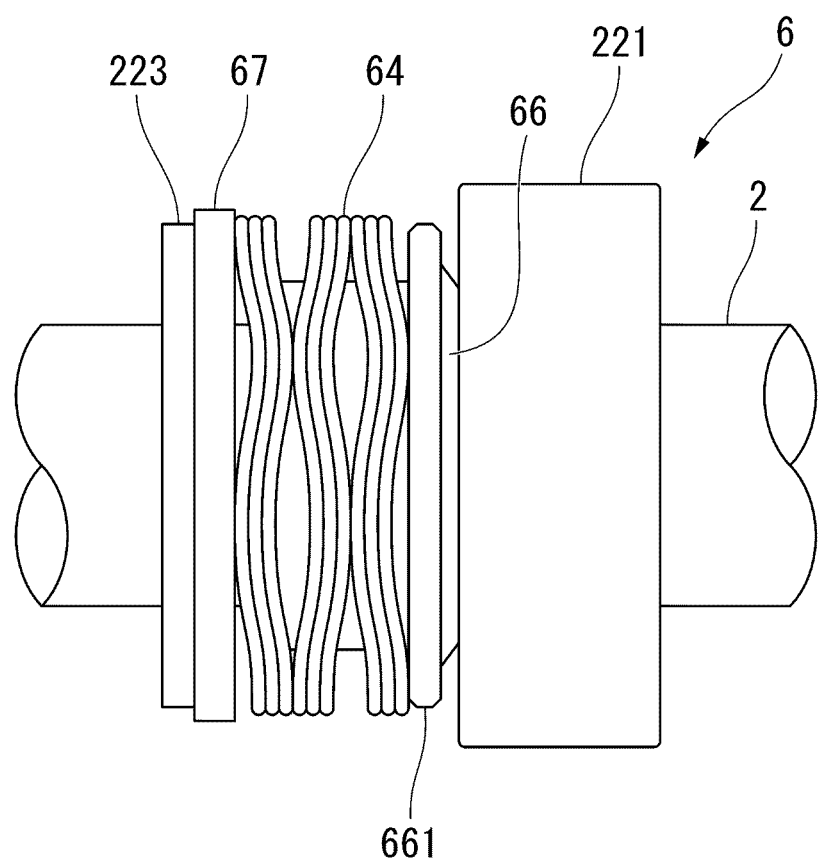
FIG. 5 is a side view illustrating the configuration of the biasing member on the left side of the spool shaft illustrated in FIG. 4.

As the biasing member 64, a corrugated annular coil spring of a multilayer winding type is used, which has the characteristic of exhibiting linearity under a high load condition and providing a stable drag curve in comparison with a disc spring, as illustrated in FIG. 5.

By swinging the drag lever 80 from the intermediate position between the separation position P2 and the clamping position P1 toward the clamping position P1, the biasing member 64 moves the sleeve portion 66 rightward and presses the drag receiver 63 rightward by the biasing force of the biasing member 64. With this, the second friction plate 631 of the drag receiver 63 comes into contact with the drag disc 61, which has been in contact with the first friction plate 621 of the pinion gear collar 62, from the left side. That is, the drag disc 61 is clamped between the first friction plate 621 and the second friction plate 631 to generate a frictional force, thereby generating a larger drag force.

Note that the biasing force of the coil spring 23 is smaller than that of the biasing member 64 and acts before the biasing force of the biasing member 64 acts (in a range from the separation position P2 to the intermediate position). Thus, in the drag mechanism 6, the drag force is exerted only by the biasing force of the coil spring 23 in the range from the separation position P2 to the intermediate position, and the drag force is exerted by the biasing force of the biasing member 64 in addition to the biasing force of the coil spring 23 in a range from the intermediate position to the clamping position P1.

As illustrated in FIG. 2, the movement mechanism 65 moves the spool shaft 2 to the side of the reel 1 opposite the handle (left side) so that the drag disc 61, the pinion gear collar 62, and the drag receiver 63 are separated from each other in the spool shaft direction in response to the movement of the drag lever 80 from the clamping position P1 side to the separation position P2 side, and moves the spool shaft 2 to the handle 4 side (right side) so that the pinion gear collar 62 and the drag receiver 63 clamp the drag disc 61 in response to the movement of the drag lever 80 from the separation position P2 side to the clamping position P1 side.

As described above, in the drag mechanism 6, in response to the movement of the drag lever 80 from the separation position P2 side to the clamping position P1 side, the spool shaft 2 is moved to the handle 4 side (right side) so that the drag disc 61 is clamped by the pinion gear collar 62 and the drag receiver 63, and the rotation of the spool 3 in the line releasing direction is braked.

To be specific, as illustrated in FIG. 2, the movement mechanism 65 includes the drag lever 80, swingably mounted to the second support tubular portion 124 of the right cover member 12A, a pulling mechanism (not illustrated) for pulling and moving the spool shaft 2 to the right in response to the frontward swing of the drag lever 80, the biasing member 64 configured to bias the spool shaft 2 leftward and move the spool shaft 2 to the left in response to the rearward swing of the drag lever 80, and a drag adjustment knob 83 mounted on the end portion of the spool shaft 2 supported by the second support tubular portion 124 and used for adjusting the braking force of the drag lever 80.

Drag Lever

As illustrated in FIG. 1, the drag lever 80 (operation member) is mounted on the outer peripheral portion of the second support tubular portion 124 of the right cover member 12A swingably between the separation position P2 corresponding to a drag free state in which the spool 3 is freely rotatable and a maximum position (the clamping position P1) corresponding to a maximum drag state of the drag mechanism 6, and a swing range of the lever is restricted so that the swing is made between the separation position P2 and the clamping position P1.

The drag lever 80 includes a mounting portion 81 swingably (rotatably) mounted on the outer peripheral portion of the second support tubular portion 124 extending outward in the radial direction of the spool shaft 2 and projecting laterally from the right cover member 12A, and an operation portion 82 that extends from the upper surface of the mounting portion 81 toward the end portion (radially outward) and that can swingably operate in a front-rear direction.

The mounting portion 81 is non-rotatably locked to a cam member (not illustrated) constituting the movement mechanism 65 and is configured to move the spool shaft 2 and the spool 3 in the spool shaft direction in response to a swing operation on the operation portion 82. The mounting portion 81 is a tubular portion having a substantially circular outer shape. The spool shaft 2 is mounted on a central portion of a side surface of the mounting portion 81, and the drag adjustment knob 83 having a cap shape is mounted on the end portion of the spool shaft 2. The operation portion 82 is integrally formed with the mounting portion 81.

The second support tubular portion 124 is disposed in such a manner that the second tubular portion 124 projects from the side surface of the bulge portion 122 of the right cover member 12A. By bringing part of the operation portion 82 into contact with the second support tubular portion 124, the drag lever 80 is positioned at a predetermined drag braking position (in this case, the clamping position P1).

Next, operations of the baitcasting reel 1 configured as discussed above will be described in detail with reference to the drawings.

The baitcasting reel 1 according to the present embodiment includes the drag disc 61 non-rotatably mounted on the spool 3; the pinion gear collar 62 to which the rotation from the handle 4 is transmitted, disposed facing the first surface on the handle side of the drag disc 61 and immovable in the spool shaft direction; the drag receiver 63 to which the rotation from the handle is transmitted, disposed facing the second surface of the drag disc 61, on the side opposite the handle, and movable in the spool shaft direction in conjunction with the spool shaft 2; the biasing member 64 configured to bias the drag disc 61 and the drag receiver 63 in a direction in which the drag disc 61 and the drag receiver 63 are separated from each other; the drag lever 80 disposed movably between the clamping position P1, where the pinion gear collar 62 and the drag receiver 63 clamp the drag disc 61 in the spool shaft direction, and the separation position P2, where the drag disc 61, the pinion gear collar 62, and the drag receiver 63 are separated from each other in the spool shaft direction; and the movement mechanism 65 configured to move the spool shaft 2 to the side opposite the handle in such a manner that the drag disc 61, the pinion gear collar 62, and the drag receiver 63 are separated from each other in the spool shaft direction in response to the movement of the drag lever 80 from the clamping position P1 side to the separation position P2 side, and configured to move the spool shaft 2 to the handle side in such a manner that the pinion gear collar 62 and the drag receiver 63 clamp the drag disc 61 in response to the movement of the drag lever 80 from the separation position P2 side to the clamping position P1 side.

Figure 6:
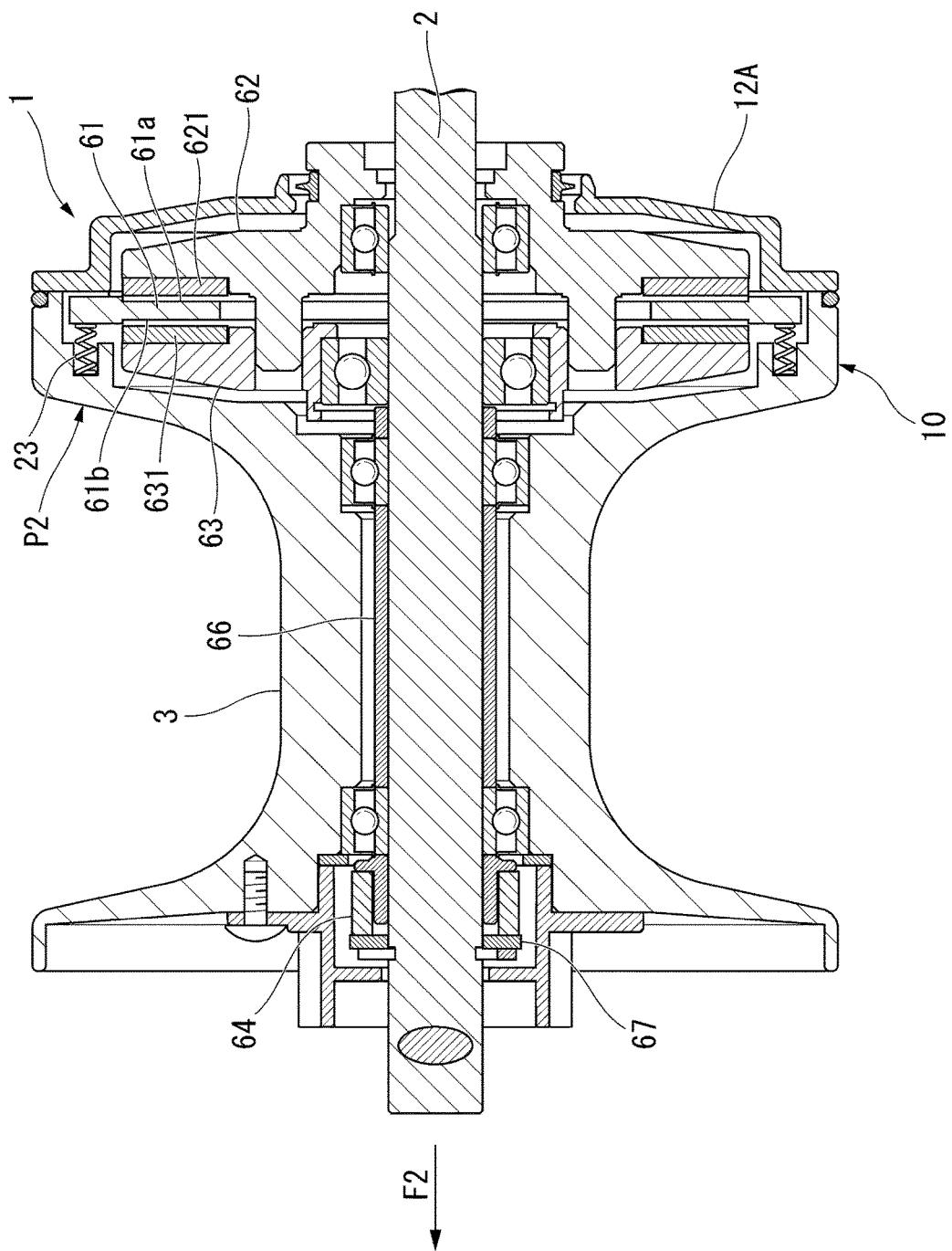
FIG. 6 is a cross-sectional view for explaining an operation procedure of a drag mechanism, and is also a diagram illustrating a state of a separation position.

With the baitcasting reel 1 according to the present embodiment, when the drag force is adjusted to be strong or weak, as illustrated in FIG. 6, the drag lever 80 is operated to move from the clamping position P1 side to the separation position P2 side, and the spool shaft 2 is moved to the side opposite the handle (left side: an arrow F2 direction in FIG. 6) by the movement mechanism 65 (see FIG. 2). As a result, the pinion gear collar 62 and the drag receiver 63 are separated from the drag disc 61 to establish a drag release state (separation position P2), so that the spool 3 becomes freely rotatable. That is, gaps are respectively formed between the first surface 61a of the drag disc 61 and the first friction plate 621 of the pinion gear collar 62 and between the second surface 61b of the drag disc 61 and the second friction plate 631 of the drag receiver 63. Consequently, casting can be performed.

Figure 7:
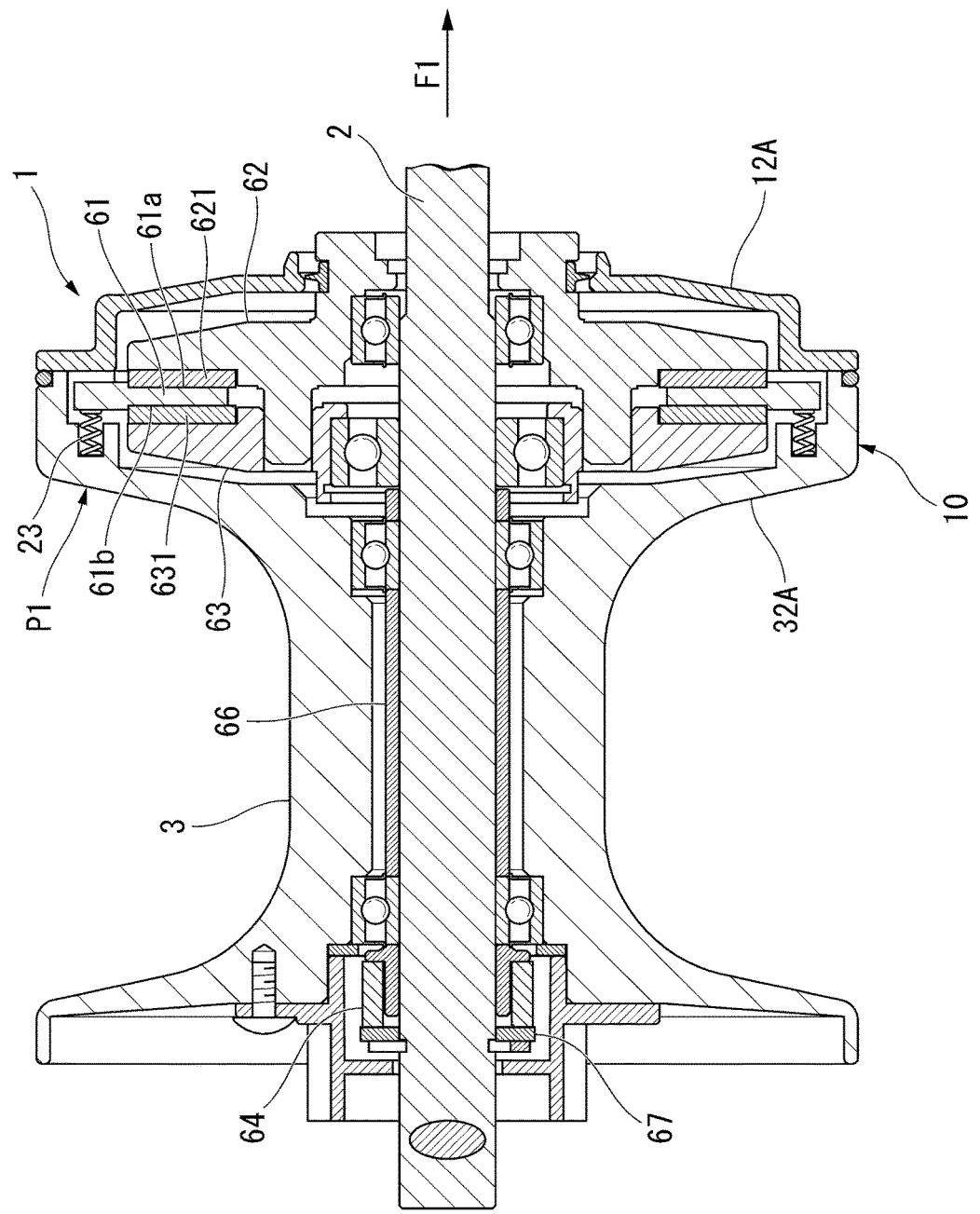
FIG. 7 is a cross-sectional view for explaining an operation procedure of a drag mechanism, and is also a diagram illustrating a state of a clamping position.
Figure 8:
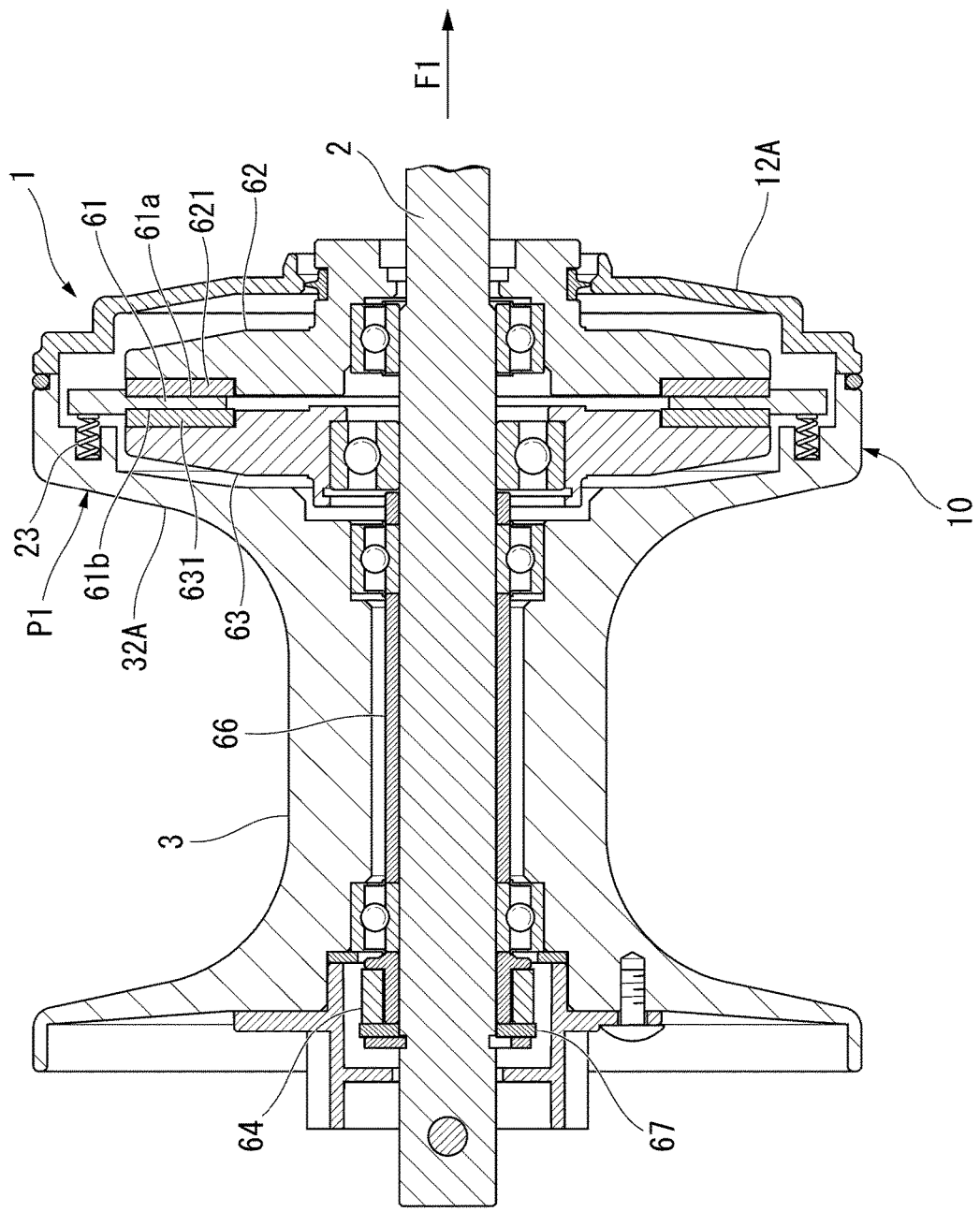
FIG. 8 is a cross-sectional view for explaining an operation procedure of a drag mechanism, and is also a diagram illustrating a state of a clamping position.

On the other hand, as illustrated in FIG. 7, in a case where the drag lever 80 is operated to swing from the separation position P2 side toward the clamping position P1 side, the spool shaft 2 is gradually moved toward the handle side (an arrow F1 direction in FIGS. 7 and 8) by the movement mechanism 65 (see FIG. 2). Then, the drag disc 61 moves to the right side together with the spool 3, integral with the spool shaft 2. Due to this, the drag disc 61 comes into contact with the first friction plate 621 of the pinion gear collar 62 by the biasing force of the coil spring 23 until reaching the intermediate position between the separation position P2 and the clamping position P1, and a weak drag force acts thereon. Further, as illustrated in FIG. 8, in a case where the drag lever 80 is swung from the intermediate position to the clamping position P1 side, the sleeve portion 66 is moved to the right side via the biasing member 64, and the drag receiver 63 is also moved to the right side. With this, the drag disc 61 is clamped by the pinion gear collar 62 and the drag receiver 63, whereby a clamping state is established. FIG. 7 depicts the spool shaft 2 in a state of moving where the first surface 61a of the drag disc 61 is in contact with the first friction plate 621 of the pinion gear collar 62, and the second surface 61b of the drag disc 61 is not in contact with the second friction plate 631 of the drag receiver 63. In FIG. 8, a portion between the first surface 61a of the drag disc 61 and the first friction plate 621 of the pinion gear collar 62 and a portion between the second surface 61b of the drag disc 61 and the second friction plate 631 of the drag receiver 63 are respectively pressed. As a result, the pressure-contact force of the pinion gear collar 62 and the drag receiver 63 against the drag disc 61 increases and a strong drag force is achieved.

As described above, in the present embodiment, the spool shaft 2 is pulled toward the handle side by the movement mechanism 65 in a case where the rotation in the reel-out direction of the spool 3 is braked by moving the drag lever 80 to the clamping position, and at least the drag disc 61, the pinion gear collar 62, and the drag receiver 63 are provided closer to the handle side than to the spool 3. As a result, the length (height) can be reduced so as to be small in the axial direction of the reel body 10 on the side opposite the handle, whereby the reel may be easier to hold.

In the present embodiment, the drag disc 61 preferably includes the first disc portion extending toward the inner side in the radial direction of the spool shaft 2 from the outer peripheral portion of the flange 32A on the handle side of the spool 3.

Accordingly, since the first disc portion of the drag disc 61 is disposed at the inner side in the radial direction of the outer peripheral portion of the handle-side flange 32A, the pinion gear collar 62 and the drag receiver 63 for clamping the first disc portion therebetween may also be disposed at positions closer to the handle side than to the spool 3. With this, the length (height) in the axial direction of the reel body 10 on the side opposite the handle may be reduced so as to be small, and the reel may thus be easier to hold.

Further, in the present embodiment, the pinion gear collar 62 includes the second disc portion extending from a gear portion that rotates with the rotation of the handle 4 toward the outer side in the radial direction of the spool shaft 2.

Accordingly, since there is disposed the second disc portion of the pinion gear collar 62 extending at the outer side in the radial direction of the gear portion provided closer to the handle side than to the spool 3, the drag disc 61 and the drag receiver 63 for transmitting a braking force via the second disc portion may also be disposed at positions closer to the handle side than to the spool 3. With this, the length (height) in the axial direction of the reel body 10 on the side opposite the handle may be reduced so as to be small, and the reel may thus be easier to hold.

In the present embodiment, the drag receiver 63 may include the third disc portion extending from the sleeve portion 66 configured to rotate together with the spool shaft 2 toward the outer side in the radial direction of the spool shaft 2.

Due to this, since there is disposed the third disc portion of the drag receiver 63 extending at the outer side in the radial direction at a portion on the handle side of the sleeve portion 66, the drag disc 61 and the drag receiver 63 for transmitting a braking force via the third disc portion may also be disposed aggregated at positions closer to the handle side than to the spool 3. With this, the length (height) in the axial direction of the reel body 10 on the side opposite the handle may be reduced so as to be small, and the reel may thus be easier to hold.

In the present embodiment, one of the pinion gear collar 62 and the drag receiver 63 includes a protrusion extending toward the other one thereof, and the other one thereof includes a hole to be engaged movably along the protrusion and rotates together with the one thereof.

With this, swinging of the drag receiver 63 along the protrusion relative to the pinion gear collar 62, which is immovable in the spool shaft direction, can be suppressed, so that the movement may be made in a stable posture. As a result, the accuracy of braking may be enhanced. In this case, since the protrusion is engaged with the hole, relative rotation of the pinion gear collar 62 and the drag receiver 63 in the circumferential direction is restricted. Then, the pinion gear collar 62 and the drag receiver 63 may be rotated together by the above-discussed simple structure.

In the present embodiment, since the biasing member 64 is a corrugated annular coil spring of a multilayer winding type, it exhibits linearity under a high load condition and a stable drag curve is obtained as compared with a disc spring, and braking with higher accuracy is possible.

With the baitcasting reel 1 configured as discussed above according to the present embodiment, since the size of the reel body 10 is reduced so as to be small, the reel may be easier to hold.

The embodiment of the present invention has been described thus far, but the above embodiment is given merely as an example and is not intended to limit the scope of the invention. The embodiment may be implemented in other various forms, and various omissions, substitutions, and modifications may be made without departing from the spirit of the invention. The embodiment and modified examples thereof include, for example, those that can be easily conceived by those skilled in the art, those that are substantially the same, and those that fall within an equivalent range.

For example, in the above-described embodiment, although a medium-sized lever drag reel has been described as an example, no such limitation is intended, and the present invention may be applied to any baitcasting reel as long as the reel is the baitcasting reel 1 including the drag lever 80.

In the present embodiment, a multilayer winding-type corrugated annular coil spring is employed as the biasing member 64 of the drag mechanism 6, but a corrugated annular coil spring may be employed instead. In this case, a characteristic of obtaining a more stable drag curve as compared with a disc spring can be provided, and braking with high accuracy can be performed.

REFERENCE SIGNS LIST

1 Baitcasting reel (Dual-bearing reel for fishing)
2 Spool shaft
3 Spool
4 Handle
5 Rotation transmission mechanism
6 Drag mechanism (Braking portion)
10 Reel body
12A Right cover member
12B Left cover member
23 Coil spring
50 Gear shifting operation mechanism
51 First main gear
52 Second main gear
53 First pinion gear
54 Second pinion gear
61 Drag disc (Drag plate, First transmission portion)
61a First surface
61b Second surface
62 Pinion gear collar (Second transmission portion)
63 Drag receiver (Third transmission portion)
64 Biasing member
65 Movement mechanism (Movement portion)
66 Sleeve portion
67 Spacer
80 Drag lever (Operation member)
82 Operation portion
P1 Clamping position
P2 Separation position

What is claimed is:
1. A dual-bearing reel for fishing, comprising:
a reel body;
a handle provided to the reel body;
a spool shaft supported in the reel body;
a spool rotatable relative to the spool shaft by operation of the handle;

a first transmission portion non-rotatably mounted on the spool;

a second transmission portion configured to be transmitted a rotation from the handle, and disposed facing a first surface on a handle side of the first transmission portion, and the second transmission portion is non-movable in a spool shaft direction of the spool shaft;

a third transmission portion configured to receive the rotation from the handle, and disposed facing a second surface on a non-handle side of the first transmission portion, the third transmission portion being movable in the spool shaft direction in conjunction with the spool shaft;

a biasing member configured to bias the first transmission portion and the third transmission portion in a direction in which the first transmission portion and the third transmission portion are separated from each other;

an operation member configured to be moveable between a clamping position where the second transmission portion and the third transmission portion clamp the first transmission portion in the spool shaft direction and a separation position wherein each of the first transmission portion, the second transmission portion, and the third transmission portion are separated from each other in the spool shaft direction; and a movement portion configured to move the spool shaft to the non-handle side in such a manner that the first transmission portion, the second transmission portion, and the third transmission portion are separated from each other in the spool shaft direction in response to movement of the operation member from the clamping position to the separation position, and configured to move the spool shaft to the handle side in such a manner that the second transmission portion and the third transmission portion clamp the first transmission portion in response to the movement of the operation member from the separation position to the clamping position.

2. The dual-bearing reel for fishing according to claim 1, wherein the first transmission portion includes a first disc portion extending from an outer peripheral portion of a flange on the handle side of the spool toward an inner side in a radial direction of the spool shaft.

3. The dual-bearing reel for fishing according to claim 2, wherein the second transmission portion includes a second disc portion extending from a gear portion that rotates with the rotation of the handle toward an outer side in the radial direction of the spool shaft.

4. The dual-bearing reel for fishing according to claim 2, wherein the third transmission portion includes a third disc portion extending from a sleeve portion that rotates together with the spool shaft toward an outer side in the radial direction of the spool shaft.

5. The dual-bearing reel for fishing according to claim 2, wherein one of the second transmission portion and the third transmission portion includes a protrusion extending toward the other one of the second transmission portion and the third transmission portion, and the other one includes a hole to be engaged movably along the protrusion and rotates together with the one of the second transmission portion and the third transmission portion.

6. The dual-bearing reel for fishing according to claim 2, wherein the biasing member is a corrugated annular coil spring.

7. The dual-bearing reel for fishing according to claim 2, wherein:

the first transmission portion includes a drag plate that rotates together with the spool, the second transmission portion includes a pinion gear collar that rotates together with the handle, the third transmission portion includes a drag receiver that is movable together with the spool shaft in the spool shaft direction, and the dual-bearing reel for fishing further includes a braking portion configured to brake rotation in a reel-out direction of the spool by moving the spool shaft toward the handle side in such a manner that the drag plate is clamped by the pinion gear collar and the drag receiver in response to the movement of the operation member from a separation position side to a clamping position side.

8. The dual-bearing reel for fishing according to claim 6, wherein the biasing member is the corrugated annular coil spring of a multilayer winding type.

9. The dual-bearing reel for fishing according to claim 1, wherein the second transmission portion includes a second disc portion extending from a gear portion that rotates with the rotation of the handle toward an outer side in the radial direction of the spool shaft.

10. The dual-bearing reel for fishing according to claim 1, wherein the third transmission portion includes a third disc portion extending from a sleeve portion that rotates together with the spool shaft toward an outer side in the radial direction of the spool shaft.

11. The dual-bearing reel for fishing according to claim 1, wherein one of the second transmission portion and the third transmission portion includes a protrusion extending toward the other one of the second transmission portion and the third transmission portion, and the other one includes a hole to be engaged movably along the protrusion and rotates together with the one of the second transmission portion and the third transmission portion.

12. The dual-bearing reel for fishing according to claim 1, wherein the biasing member is a corrugated annular coil spring.

13. The dual-bearing reel for fishing according to claim 12, wherein the biasing member is the corrugated annular coil spring of a multilayer winding type.

14. The dual-bearing reel for fishing according to claim 1, wherein:

the first transmission portion includes a drag plate that rotates together with the spool, the second transmission portion includes a pinion gear collar that rotates together with the handle, the third transmission portion includes a drag receiver that is movable together with the spool shaft in the spool shaft direction, and the dual-bearing reel for fishing further includes a braking portion configured to brake rotation in a reel-out direction of the spool by moving the spool shaft toward the handle side in such a manner that the drag plate is clamped by the pinion gear collar and the drag receiver in response to the movement of the operation member from a separation position side to a clamping position side.

15. A dual-bearing reel for fishing, comprising:
a reel body;
a handle provided to the reel body;
a spool shaft supported in the reel body;
a spool rotatable relative to the spool shaft by operation of the handle;
a drag disc non-rotatably mounted on the spool;
a pinion gear collar to which rotation from the handle is transmitted disposed facing a first surface of the drag disc and immovable in a spool shaft direction, the first surface of the drag disc being on a handle side;
a drag receiver to which the rotation from the handle is transmitted, disposed facing a second surface of the drag disc and movable in the spool shaft direction in conjunction with the spool shaft, the second surface of the drag disc being on a side opposite the handle;
a biasing member configured to bias the drag disc and the drag receiver in a direction in which the drag disc and the drag receiver are separated from each other;
a drag lever disposed movably between a clamping position in which the pinion gear collar and the drag receiver clamp the drag disc in the spool shaft direction, and a separation position, in which the drag disc, the pinion gear collar, and the drag receiver are separated from each other in the spool shaft direction; and
a movement mechanism configured (1) to move the spool shaft to the side opposite the handle such that the drag disc, the pinion gear collar, and the drag receiver are separated from each other in the spool shaft direction in response to a movement of the drag lever from the clamping position to the separation position, and (2) to move the spool shaft to the handle side such that the pinion gear collar and the drag receiver clamp the drag disc in response to a movement of the drag lever from the separation position to the clamping position.

* * * * *